Dec. 1, 1959   E. WOLL   2,914,912
COMBUSTION SYSTEM FOR THERMAL POWERPLANT
Original Filed March 10, 1949   2 Sheets-Sheet 1
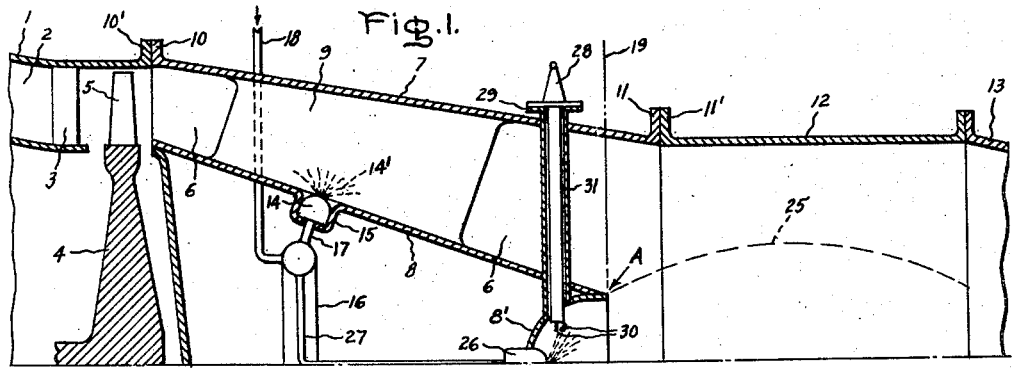
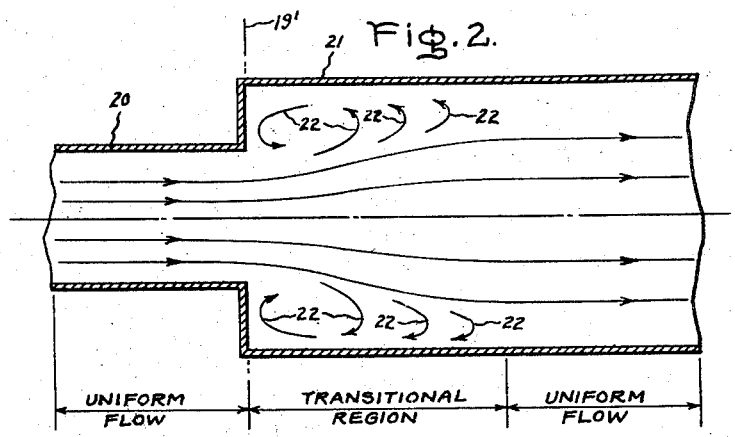
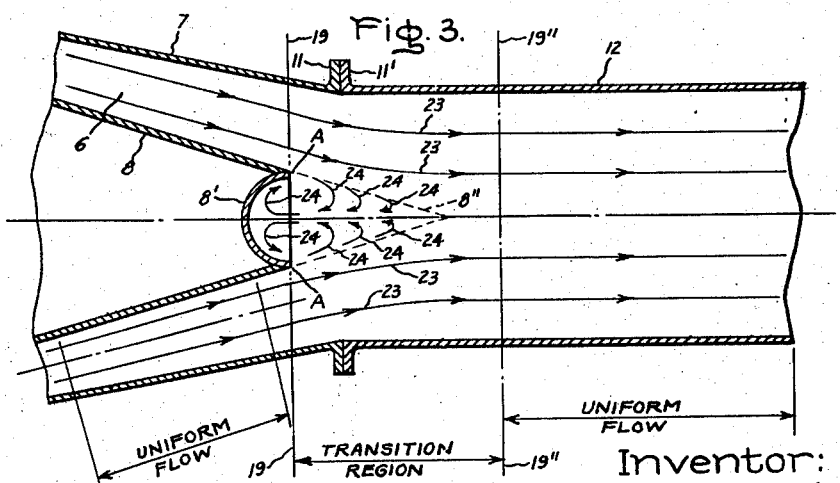
Inventor:
Edward Woll,
by  *Francis S. Mack*
His Attorney.

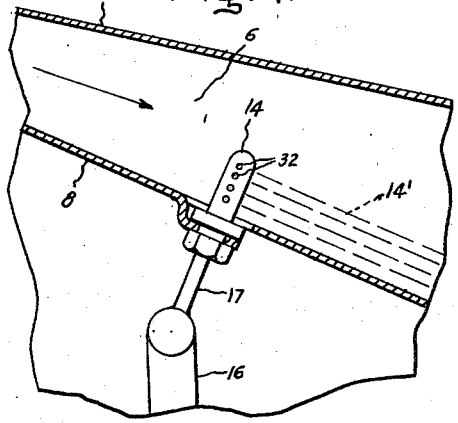
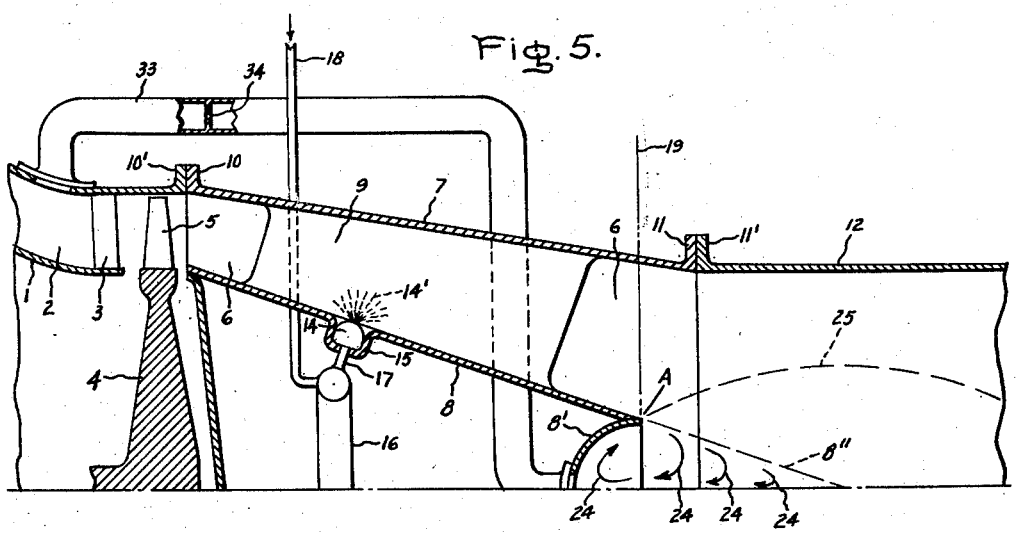

United States Patent Office 2,914,912
Patented Dec. 1, 1959

2,914,912

COMBUSTION SYSTEM FOR THERMAL POWERPLANT

Edward Woll, Wenham, Mass., assignor to General Electric Company, a corporation of New York Continuation of application Serial No. 80,696, March 10, 1949. This application October 24, 1955, Serial No. 542,391

3 Claims. (Cl. 60—35.6)

This application is a continuation of my prior application, Serial No. 80,696 filed March 10, 1949, now abandoned.

This invention relates to internal combustion powerplants and has particular reference to the combustion of hot gases subsequent to their discharge from a turbine stage in such a plant. It has found particular utility in connection with gas turbine powerplants for effecting the propulsion of aircraft, as for example in jet-propelled aircraft. It is this application of the invention which I have elected specifically to illustrate and describe. It is to be understood, however, that the invention is not limited thereto necessarily.

A gas turbine power plant for the propulsion of aircraft may include an air compressor, combustion apparatus, and a gas turbine compactly arranged in series-flow relation to keep the weight, overall length and diameter to a minimum. In such a power plant, the turbine is driven by hot gases generated by the compressor and the combustion apparatus, and the turbine extracts at least sufficient power from these gases to drive the compressor. The remaining power in the hot gases may be used to propel the aircraft by ejecting the gases rearwardly from the turbine at high velocity through a suitable propelling nozzle.

In numerous instances it has been found that when powerplants of the type described and installed in a jet-propelled airplane, the powerplant will barely yield adequate thrust for take-off purposes, even though the powerplant is capable of furnishing the thrust required for maintaining normal flight speeds. Experience has also indicated that after a military airplane is put into actual field service, its take-off thrust may have become inadequate due to increases in airplane weight which has been brought about by various military requirements. In many instances it has also been found that combat military aircraft are invariably called upon to do more than that for which they were originally designed. Special military missions often demand extra bursts of speed for short periods of time. In view of these special instances, and for the additional reason that jet-propelled aircraft have relatively poor take-off and climb characteristics resulting from inherently low propulsion efficiency of such aircraft at low flight speeds, it is desirable that additional thrust be made available without resorting to the use of an oversize powerplant with the attendant increase in dead weight.

An elementary way to augment the normal thrust of such a powerplant is simply to operate at an over-speed condition. However, this has the serious disadvantage of appreciably reducing the operating life of the powerplant. Another simple way in which thrust augmentation may be achieved is by the injection of water, alcohol, ammonia, or other suitable fluids at the inlet of the compressor, or by injection of such fluids into the combustion chambers, but experience has shown that each of these relatively simple expedients is subject to the criticism that only limited increases in thrust can be obtained. The peak pressures that can be supported by the compressor impose a limit on the rate of fluid injection, and exceeding this limit would cause the compressor to stall, thus leading to operation of the turbine and the combustion chamber parts at temperatures greatly exceeding their normal and safe operating values. In addition, experience has shown that operation at high rates of fluid injection has led to decreased life of the power plant. Many methods for achieving thrust augmentation are known but are subject to the above-mentioned or similar limitations.

Accordingly, it is an object of this invention to provide a novel arrangement for augmenting the power developed by a gas turbine powerplant which overcomes the above-mentioned disadvantages.

A further object is to provide a system of the type described, which is mechanically simple yet thermodynamically effective, and which does not impair or interfere with normal powerplant performance during periods when the augmentation system is not in use or operation.

Another object is to provide an "after-burning" or "reheating" arrangement for a powerplant of the type described which is capable of operating with stable combustion over a wide range of fuel flows.

Still another object of the invention is to provide improved means for igniting combustible fluids which are flowing at velocities exceeding the velocity of flame propagation.

It is a further object of the invention to provide new and improved means for operating turbine apparatus whereby ignition and stable combustion of fluids flowing at velocities exceeding the velocity of flame propagation can be effected over a wide range of fuel flow rates.

Other objects and advantages will be apparent from the following description taken in connection with the accompanying drawings, in which Fig. 1 is a half-sectional view of an exhaust system for a gas turbine powerplant in accordance with the invention; Fig. 2 is a diagrammatic representation of fluid flow in the region of a sudden enlargement in a flow conduit; Fig. 3 is an enlarged detailed view illustrating the nature of the flow pattern of the hot gases in the region of a sudden enlargement provided in the exhaust system of Fig. 1; Fig. 4 is an enlarged detailed view showing a modified nozzle arrangement for injecting fuel into the fluid passage; and Fig. 5 is a modified embodiment of the arrangement shown in Fig. 1.

Referring now to Fig. 1, a turbine inlet casing is partially indicated at 1, having an inlet passage 2 which communicates with turbine nozzles 3. Motive fluid under pressure and at high temperature is supplied to the turbine nozzles 3 from inlet passage 2. For example, the motive fluid may be air which is compressed in a suitable compressor and is heated subsequent to its discharge from the compressor by burning fuel in the air in suitable combustion chambers. When air is employed as a motive fluid, it is common practice to employ high air-fuel ratios, for example, of the order of 60 to 1 in order to limit the maximum temperature of combustion to a value which the turbine and combustion chamber materials can withstand with a reasonable degree of safety. It will be appreciated by those skilled in the art that in such cases the motive fluid discharged from the turbine will contain sufficient unburned oxygen to support additional combustion. The compressor, combustion system, and connecting conduits are not material to an understanding of the present invention, and are more particularly disclosed in U.S. Patent 2,432,359—Streid, and in U.S. Patent 2,711,074—Howard, assigned to the assignee of the present application. The turbine nozzles 3 expand the fluid to a suitable velocity and direct it at a proper angle to a turbine wheel or bladed rotor 4 which is rotatably supported in suitable bearings (not shown) in the turbine casing. The turbine rotor 4 is connected by means of suitable shafting and/or gearing (not shown) to a consumer of power, for example, to the compressor which furnishes the pressurized motive fluid.

After passing through blading 5 of the turbine wheel, the fluid is discharged to an exhaust passage 6. It has been found convenient, particularly in aircraft service, to construct exhaust passage 6 by an outer wall or casing 7 and an inner wall 8, each of which walls may be cones or portions thereof and made of relatively thin sheet metal. Supporting and flow straightening members 9 may be provided for the purpose of maintaining walls 7, 8 concentric and in spaced relation to each other to define an annular passage, as well as for the purpose of removing tangential components of velocity from the fluid discharged from the turbine blades 5. It is to be understood, however, that the above described configuration is not limiting and that other arangements and wall shapes may be employed with equally good results. A flanged portion 10 is provided at one extremity of wall 7 to facilitate attachment of the exhaust structure comprising walls 7, 8 and supporting members 9 to turbine casing 1, which is provided with a similar mating flange 10'. Flange 10, and thus the entire exhaust structure, is secured to the mating flange 10' on the turbine casing by a "quick-disconnect" clamp which may be of the type disclosed in U.S. Patent 2,424,436—Crater, or by other types of known securing means such as threaded fastenings. Similarly, flange 11 is provided at the opposite extremity of wall 7 for attachment to a similar mating flange 11' secured to a conduit 12 which conducts the gases to a suitable propelling nozzle 13.

Since, as previously indicated, the turbine removes at least sufficient power from the net motive fluid to drive the compressor, the pressure and temperature of the motive fluid discharged from the turbine wheel to passage 6 are considerably less than the pressure and temperature of the fluid in passage 2 preceding the turbine nozzles 3. In power plants used for effecting the propulsion of aircraft, the total or dynamic pressure of the motive fluid in passage 6 normally will be greater than the static ambient atmospheric pressure. Expansion of the motive fluid from its super-ambient pressure and temperature in exhaust passage 6 to the static pressure of the ambient atmosphere through nozzle 13 produces a certain velocity of the motive fluid in a rearward direction relative to the aircraft. The reaction resulting from this rearward velocity produces a forward thrust on the aircraft.

It is well known that the magnitude of thrust reaction in a dynamic fluid system is proportional to the mass flow of fluid and also to the velocity of the fluid. Thus, if either the mass flow or the velocity of the fluid can be increased in any manner, an increased thrust will result. It is also well known that the velocity of fluid issuing from a nozzle can be increased by increasing the pressure or temperature of the fluid preceding the nozzle. To this end I provide means for the addition of heat to the motive fluid at a location between the entrance to the annular exhaust passage 6 and the entrance to nozzle 13. A plurality of spray nozzles 14 are provided at the downstream side of the turbine wheel 4 and are arranged to inject fuel into exhaust passage 6. Spray nozzles 14 may be of any type which produce a fine spray of fuel particles 14', and may be similar to that disclosed in U.S. Patent 2,524,820—Miles assigned to the same assignee as the present application. In order to minimize the pressure loss in the exhaust passage 6, it is desirable to arrange the spray nozzles 14 in such a manner that they do not extend into the stream of fluid. This may be accomplished by providing recessed portions 15 in wall 8 of sufficient depth to permit the installation of nozzles 14 in substantially flush relation with the wall of passage 6. It is to be understood, however, that other arrangements such as that shown in Fig. 4 may be used with good results.

From the standpoint of obtaining maximum mixing of the fuel and hot gases prior to ignition, it is desirable to arrange nozzles 14 in a common plane axially spaced downstream from the turbine wheel and with such axial spacing reduced to an absolute minimum. Due to manufacturing variations, it has been found to be virtually impossible to achieve absolute uniformity of pressure distribution in passage 6 immediately adjacent the turbine wheel and thus there may be a cross-circulation of hot gases across the rear face of turbine wheel 4. It is therefore desirable to locate nozzles 14 in a common plane which is more remotely spaced from the turbine wheel in order to preclude the possibility of fuel particles, which may ignite spontaneously, becoming entrained in the above-mentioned cross-circulation. In practice, the design is made a compromise of these conflicting considerations, and experiments have indicated that the exact location of the plane, in which nozzles 14 are located, does not appear to be critical.

In order to achieve uniform heating of the fluid and thus to avoid excessive distortion and perhaps even failure of the exhaust structure, nozzles 14 are uniformly spaced around the outer periphery of inner wall 8 and are connected to a common manifold 16 by connecting conduits 17. Fuel under pressure is supplied at a variable rate from a suitable source (not shown) by means of conduit 18 to manifold 16 and thus to the spray nozzles 14. In aircraft service it is necessary to operate the power plant at sea level and at high altitude, and under such varying conditions of operation the air flow may vary through a range of at least 10–20 to 1. Therefore, it is necessary to provide for a range of fuel flow of the same magnitude. In addition, a reheat system for aircraft service must be capable of stable operation for fuel flows both equal to and considerably less than the theoretical stoichiometric proportions of fuel and air for complete combustion of the fuel. In view of these considerations and to keep the fuel pressure within practical limits, it may be desirable to employ nozzles 14 of the duplex type and provide two manifolds 16 which are connected by a flow divider (not shown). A duplex nozzle arrangement of the type suggested is more fully described in U.S. Patent 2,622,393—Edwards et al. assigned to the assignee of the present application. As indicated in Fig. 1, the supporting members 9 may be hollow. Such arrangement furnishes convenient means for introducing fuel to the interior of wall structure 8 and to the spray nozzles 14, and at the same time the hollow construction of member 9 effects considerable saving in weight, which is particularly important in aircraft service.

For reasons which will appear later, it is necessary to "stall" the fluid or a portion of the fluid flowing from the exhaust passage 6 to conduit 12. The term "stall" as used herein means that the fluid velocity is reduced to a low value less than the velocity of flame propagation in the fluid. The term "stalled region" or "quiescent zone" as used hereinafter, refers to a region within the fluid passage wherein the fluid is "stalled" as previously defined. Extensive testing experience has shown that when fuel is introduced into a high velocity fluid stream, even though in the proper stoichiometric proportions to form a combustible mixture, the mixture may be very difficult to ignite. Experimentation has further shown that in order to effect ignition and to obtain burning under stabilized conditions, it is necessary to "stall" a portion of such a high velocity fluid stream, or at least to reduce the velocity of a portion of the combustible mixture to a very low value as compared to the velocity of the fluid in other portions of the passage. One very simple way in which such a "stalled" region may be created is to insert an obstruction in the fluid passage. In such case the region immediately adjacent the obstruction at its downstream side will be effectively stalled and the local velocities of the fluid within the region will be extremely low compared to the velocity of the fluid in other portions of the passage. Obviously such a method for effecting ignition in a thermodynamic fluid system is subject to the serious objection that it introduces pressure losses into the system thereby adversely effecting thermodynamic efficiency and greatly reducing the mechanical power which might otherwise be obtained from such a system.

I have found that such a "stalled" region can be created by providing a wall 8', which effectively cuts off the vertex of the cone which would otherwise be formed by wall 8. As illustrated in Fig. 1, wall 8' preferably is hemispherical in shape, although it may be constructed of other suitable shapes. Considering now, the geometry of cone portion defined by wall 7, 8 it will be seen that the effect of cutting off the vertex of the cone, which would otherwise be formed by wall 8, is to create a sudden enlargement in the area of the fluid passage 6 to the right of plane 19. In other words, to the left of the plane 19, exhaust passage 6 is the annular space defined by walls 7, 8, while to the right of plane 19 the above-mentioned passage is circular in cross section and is defined first by wall 7 alone, and then by wall 12 alone.

It will be seen presently that this change in area produces two important effects. First, the increased area of the passage will reduce the velocity of the fluid in the "stalled" region to a certain velocity less than its original value. The magnitude of the reduced velocity will be determined substantially by the cross-sectional area of conduit 12 and the average density of the fluid therein. Secondly, in the immediate vicinity of the sudden enlargement, or more specifically, in the central portion of the passage near the righthand extremity of wall 8', the fluid flowing in the passage will undergo a transition in which its pressure and velocity rapidly change in an attempt by the fluid to completely fill the cross-sectional area of conduit 12. In this transitional region, because of the sudden enlargement in flow area and the attempt of the fluid to completely fill the available space, there will be considerable turbulence and eddying of the fluid. However, as will appear presently, the velocity of the fluid in this region will be relatively low compared to the velocity of the fluid in other portions of the system for example, in passages 6 or in conduit 12.

A better understanding of the nature of the flow pattern established in the region of the previously described sudden enlargement can be had by comparison with similar flow patterns in the region of sudden enlargements as they are conventionally represented. Fig. 2 represents the type of flow pattern which is obtained when fluid which is flowing from left to right in a first conduit 20 flows into a second conduit 21 having a substantially greater flow area than that of the first conduit. In an ideal case where there are no losses in the system, the total pressure of the fluid would be the same on either side of plane 19' in which the sudden enlargement takes place. To the left of plane 19' the static pressure will be low relative to the static pressure at the right, and the velocity to the left of plane 19' will be considerably higher than that at the right due to the difference in flow area. In the transitional region indicated in the drawing, the velocity of the fluid is reduced and the static pressure is increased in the attempt of the fluid to completely fill the enlarged flow area. Due to the increased static pressure at the right of plane 19' and because there is a tendency for a portion of the flow to separate at its periphery, a reverse flow or back eddy as indicated by arrows 22 will be formed. The regions indicated by arrows 22, constitute the "stalled" regions of the type previously defined. The portion of the total flow, which separates and flows in the manner indicated by arrows 22, usually is a small percentage of the total flow and the velocities in the "stalled" regions are relatively low due to the fact that the differences in static pressure at locations to the left of plane 19' and at the right of plane 19' generally are small.

Referring now to Fig. 3, the main flow from passage 6 to conduit 12 is indicated by arrows 23. As previously indicated, the effect of cutting off the vertex of the cone which would otherwise be formed by wall 8 is to create a sudden enlargement in the passage at plane 19. The transitional region in which the flow undergoes a change in an attempt to completely fill the increased area of the passage is indicated between planes 19 and 19''. For the same reasons as already indicated in connection with Fig. 2 the static pressure to the right of plane 19 is greater than the static pressure of the fluid at plane 19. The higher static pressure at the right of plane 19 causes a portion of the flow to separate and form a reverse eddy indicated by arrows 24. Thus it will be seen that the "stalled" region is bounded on the left by wall 8', and to the right of plane 19 substantially by the vertex of the cone surface which would be formed by the continuation of wall 8 as indicated by broken lines 8''. Experiments have shown that the ratio of the projected area defined by wall 8' to the flow area of conduit 12 including the "stalled" region should be maintained between .05 and .15 to obtain satisfactory and stable combustion at average fluid velocities of the order of 500 feet per second or higher. Stated in another way, the flow area of conduit 12 should be from 5 to 20 percent greater than the area of annular passage 6 at plane 19.

In gas turbines of the type described, the velocity of the fluid leaving the turbine wheel may be of the order of 800 to 1200 feet per second. Velocities of this magnitude generally exceed the velocity of flame propagation in the fluid. It has been shown by mathematical analysis and verified by experiments that the pressure losses in a high velocity fluid system which arise solely from aerodynamic and thermodynamic reasons may greatly exceed pressure losses which are due to fluid friction and to fluid shearing forces. This is particularly true where extremely high velocities are involved. It can also be shown by mathematical analysis that there is a decrease in total pressure upon the application of heat to a stream of flowing fluid when the heat is applied at constant pressure or at constant flow area, and that the decrease in total pressure can be minimized by reducing the Mach number of the fluid prior to the application of heat to as low a value as is practicable. It will be appreciated by those familiar with the art that the Mach number is the ratio of the actual local velocity of the fluid to the local acoustic velocity in the fluid. Therefore, it is common to provide an exhaust passage 6 which gradually increases in area in order to diffuse and thus reduce the velocity of the fluid to as low a Mach number as practicable before introducing the gas to the stalled region. It will be obvious to those familiar with the art that this requirement calls for extremely large passage areas and, particularly in aircraft service, a compromise must be made in order to minimize pressure drop and at the same time obtain apparatus which is reasonable in size and weight. Experiments have shown that good results are obtained with reasonable passage areas if the average fluid velocity is reduced to a Mach number between .2 and .3 at the upstream side of plane 19. It will also be obvious that by providing exhaust passage 6 with a gradually increasing area, a gentle transition from the relatively small area defined by the turbine annulus to the relatively large area defined by conduit 12 is provided which further tends to minimize pressure loss. The function and the effect upon the operation of the system illustrated in Fig. 1 of the "stalled" region referred to above will appear later. It will suffice at this point to state that by means of this "stalled" region, ignition of the fuel in the high velocity stream of fluid subsequent to its discharge from the turbine blades 5 is accomplished.

It is desired particularly to point out that sufficient structure has been disclosed at this point to effect ignition of a stream of flowing fluid which has been mixed with fuel in sufficient proportions to create a combustible mixture. It is necessary, however, that the average temperature of the stream of flowing fluid be at least as high as the ignition temperature of the combustible mixture. In cases where this condition cannot be met, I have found that combustion may be initiated in the "stalled" region by alternative methods to be described later.

Combustion of the high velocity fluid-fuel mixture is initiated in the following manner. Motive fluid is supplied to the turbine inlet passage 2 under pressure and at high temperature. The fluid is expanded by means of nozzles 3 which direct the fluid at suitable velocity and in the proper direction to the turbine blading 5. The turbine is driven by the hot motive fluid and at least sufficient power is extracted therefrom to drive the compressor. Upon being discharged from the turbine wheel, the motive fluid is discharged into passage 6 at reduced pressure and temperature, and at high velocity. As previously indicated, it is common for the axial velocity of the fluid in passage 6 to be of the order of 800 to 1200 feet per second. As previously indicated, fuel is introduced into the high temperature fluid flowing in passage 6. The fuel is introduced at low velocity relative to the velocity of the fluid stream and in a substantially radial direction as substantially normal to the path of the high velocity fluid stream, to insure adequate mixing of the fuel and the hot motive fluid. Because this fuel is introduced at low velocity there is litttle tendency for it to penetrate deeply into the fluid stream. A stratified layer of mixed fuel and hot motive fluid is formed adjacent to inner wall 8. The combination of the relatively low radial velocity of the fuel and the high axial velocity of the hot motive fluid in passage 6 tends to confine the fluid-fuel mixture to the regions immediately adjacent wall 8, and also tends to confine this mixture to the central portion of conduit 12. When the fluid-fuel mixture passes to the right of plane 19, at least a portion of the mixture separates and enters the "stalled" region in the manner previously described. As previously indicated, the velocity of the mixture in this region will be greatly reduced from its previous value, and when the temperature of the fluid is above the ignition temperature of the fluid-fuel mixture spontaneous ignition will occur if the local velocities of the mixture are less than the velocity of flame propagation. After combustion has been initiated, burning is first confined to the "stalled" region previously defined in connection with Figures 2 and 3, and then tends to propagate in all directions. That portion which has been ignited in the "stalled" region serves as a pilot burner to ignite the previously-described stratified mixture which continues to flow along the wall 8 and into the central portion of conduit 12. Ignition of this mixture first occurs at the point marked A in Fig. 1. Since the speed of flame propagation is less than the axial velocity of the fluid-fuel mixture, the flame front will be deflected from a radial plane to form a combustion zone at the center of conduit 12 substantially as indicated by broken lines 25. In certain types of service the temperatures within the combustion zone defined by lines 25 may be as high as 3800° F., and thus the importance of keeping the flame confined to the central portion of the pipe will be appreciated. It is an important feature that according to the invention the flame is confined to the central portion of the exhaust conduit 12 by the high velocity gas stream, and that a relatively cool annular layer of motive fluid is interposed between the flame boundary and the inner wall of conduit 12, thereby maintaining the conduit walls at a temperature much lower than that in the central portion of the gas stream. Experiments have shown that good results are obtained by limiting the penetration of the fuel particles to a value not exceeding 75 percent of the spacing between the inner and outer walls 7 and 8.

Again referring to Fig. 1, if desired, an additional fuel spray nozzle 26 may be provided at the central axis of wall 8'. In such case nozzle 26 serves as a pilot burner and is supplied with fuel conveyed by a suitale conduit 27 from the fuel supply means. The fuel conveniently may be taken from manifold 16 as indicated or may be supplied from an entirely separate source (not shown).

Still referring to Fig. 1, in applications where the temperature of the gases discharged from the turbine blade 5 is less than the ignition temperature of the fluid-fuel mixture, other means must be resorted to in order to initiate combustion of the mixture. To this end an igniting device 28, which conveniently may be a suitable electrically energized spark plug, is provided to initiate combustion in the "stalled" region. Spark plug 28 is supported on outer wall 7 by a mounting flange 29 in such a manner as to project through walls 8 and 8'. The spark plug is located in relation with wall 8' so that electrodes 30 defining the spark gap are located within the space enclosed by wall 8' and plane 19. Electrodes 30 may be arranged so that the spark gap is in the normal path of the fuel particles discharged from nozzle 26 although experiments have shown that the location of the spark gap is not critical. A cylindrical coaxially spaced metal sleeve 31 surrounds the spark plug in order to protect it from the harmful effect of the hot gases flowing in passage 6.

In operation, the arrangement shown in Fig. 1 functions in a manner very similar to the arrangement previously described wherein nozzle 26 and spark plug 28 are omitted. Fuel is introduced into passage 6 by nozzles 14 in such a manner as to limit the degree of penetration of the fuel particles into the gas stream. As previously indicated, this causes a stratified layer of fluid-fuel mixture to be formed adjacent to wall 8. As before, a portion of this mixture becomes stalled in the "stalled" region with the local velocities of the mixture in this region less than the velocity of flame propagation so that the combustible mixture can be ignited by energizing the spark plug. It will be apparent that the spark plug may be energized either manually, or automatically when fuel is supplied to nozzles 14. Once ignition has been initiated in the "stalled" region, combustion occurring within this region serves as a pilot burner to initiate and stabilize combustion of the stratified layer of fuel gas mixture which flows past point A in the manner previously described.

More accurate control of the degree of penetration of the fuel spray 14' into exhaust passage 6 may be had at the expense of a slight amount of pressure loss by employing a spray nozzle 14 of the type indicated in Fig. 4. The body of the nozzle is made of sufficient length to secure the desired degree of penetration of fuel particles and a plurality of orifice openings 32 in a common plane and normal to the axis of the nozzle body are provided therein. It will be apparent that the spacing of openings 32 with respect to inner wall 8 will afford accurate control of the degree of penetration of the fuel particles into the passage.

In operation, the openings 32 are arranged to discharge into passage 6 in a direction normal to the axis of the passage and tangentially with respect to inner wall 8. Since the fluid flow in passage 6 is predominantly axial in direction, good mixing of the fuel and motive fluid is obtained and a stratified layer of fluid-fuel mixture is formed adjacent to wall 8 in the manner previously described.

A modified embodiment of the invention is illustrated in Fig. 5 wherein an arrangement is disclosed for effecting ignition of the fuel-gas mixture when the temperature of the gas flowing in passage 6 is less than the ignition temperature of the fuel-gas mixture and when it is desired to eliminate the need for an electric igniting device. A conduit 33 connects the passage 2 preceding the turbine nozzles and the "stalled" region. A flow restricting orifice 34 is provided in conduit 33 to limit the flow of fluid through the conduit and to reduce the static pressure of the fluid within conduit 33 and of the downstream side of orifice 34 to a value only slightly in excess of that existing in the "stalled" region. The reduction of pressure of the fluid flowing through conduit 33 is necessary to insure that this fluid is introduced into the "stalled" region at relatively low velocity. Since no power is removed from the gases flowing through conduit 33 in this manner, it will be obvious that the temperature of this fluid will greatly exceed the temperature of the fluid discharged by the turbine into passage 6.

In operation, motive fluid is supplied to the turbine inlet passage 2 under pressure and at high temperature. A portion of the fluid is expanded by means of turbine nozzles 3 which direct the fluid at suitable velocity and in the proper direction relative to the turbine blading 5 to drive the turbine. Other portions of the motive fluid flow through conduit 33 and are introduced into the "stalled" region at relatively low velocity. The temperature of motive fluid thus introduced to the "stalled" region will greatly exceed the temperature of the fluid discharged by the turbine for the reason previously indicated. Fuel is injected into exhaust passage 6 in the manner previously indicated in connection with Fig. 1 and 4 so as to form a stratified layer of fluid-fuel mixture surrounding wall 8. In general, the temperature of the fluid from conduit 33 will exceed the ignition temperature of the fluid-fuel mixture. As in the preceding cases, a portion of this stratified layer enters the stalled region and the remaining portion flows into the central portion of conduit 12. That portion of the mixture which enters the "stalled" region upon coming in contact with the high temperature gas introduced to the region by means of conduit 33 is caused to ignite spontaneously due to the low velocity of the mixture in this region and the high temperature of the gases introduced through conduit 33. Combustion of the mixture in the "stalled" region in this manner serves as a pilot burner to initiate and stabilize combustion of the remaining portion of the stratified layer of gas-fuel mixture flowing past point A in the drawing. The shape of the combustion zone and the confining of flames to the central portion of conduit 12 as well as cooling of the walls of conduit 12 are effected in the same manner as in the previous arrangements.

Thus it will be apparent that the invention provides a novel and relatively simple system for augmenting the power developed by gas turbines wherein the flame is confined to the central portion of the discharge conduit and a relatively cool layer of motive fluid is interposed between the flame boundary and the conduit wall to maintain the wall at a temperature much lower than that in the central portion of the gas stream. Furthermore the invention permits stable combustion over a wide range of fuel-flows; the use of high combustion temperatures in the re-heat system is permitted because of the improved cooling; the use of light gauge sheet metal walls is permitted because the surface of the exhaust conduit is swept by turbine exhaust gases at substantially turbine discharge temperature; and the invention permits the use of a substantially unobstructed exhaust passage, thereby minimizing system losses and reducing the possibility of mechanical failure; and performance in unimpaired by the presence of such an arrangement during periods when the augmentation device is hot in operation.

While particular embodiments of the invention have been illustrated and described, it will be obvious to those familiar with the art that various changes and modifications may be made without departing from the invention, and it is intended to cover in the appended claims all such changes and modifications as come within the true spirit and scope of the invention.

What is claimed is:

1. A reheat system for use in turbo-machines comprising: a passage for diffusing a stream of combustion-supporting fluid and reducing its velocity to a Mach number of .25, said passage being defined by diverging inner and outer walls, the inner wall forming a frustum of a cone; fuel injection means mounted flush with the inner wall near the upstream end of the frustum, said injection means being adapted to inject fuel into the stream of fluid so as to form a stratum of fuel-fluid mixture adjacent the inner wall surrounded by a stratum of fuel-free fluid adjacent the outer wall; a re-entrant wall extending into the downstream end of the frustum with its edge coincident with the downstream end of the inner wall, the depth of the re-entrant wall being no greater than the radius of the downstream end of the frustum, said re-entrant wall cooperating with the outer wall to form a sudden enlargement in said passage for stalling a portion of the fuel-fluid mixture in the center of the enlargement; and ignition means mounted in the re-entrant wall for igniting the stalled portion of the fuel-fluid mixture, which in turn ignites the remainder of the mixture; whereby the burning fluid-fuel mixture is confined and surrounded by the stratum of fuel-free fluid, thus preventing burning adjacent the outer wall of the passage.

2. In a turbine power plant, reheat means for combustion-supporting fluid comprising: coaxial spaced inner and outer walls defining a fluid passage having a diffusing portion of annular cross-section and a downstream portion of substantially circular cross-section with a flow area at least 10% greater than that of said diffusing portion, said inner wall defining the frustum of a cone terminating abruptly at the change from annular to circular cross-section; a re-entrant wall extending into the downstream end of the frustum with its edge coincident with the downstream end of the inner wall, said re-entrant wall forming a stalled region beyond the end of said frustum; fuel injection means mounted in the inner wall near the upstream end of the frustum for forming a stratified layer of preselected depth of fluid-fuel mixture within the diffusing portion of the passage adjacent said inner wall and surrounded by an outer layer of combustible fluid substantially free from fuel; and igniting means mounted in the re-entrant wall, whereby the fluid-fuel mixture in the stalled region is caused to ignite, the combustion of the ignited stalled portion causing the remainder of said stratified mixture flowing past the periphery of said stalled region to become ignited.

3. Apparatus in accordance with claim 6 wherein said igniting means includes a conduit for introducing a combustible fluid into the central portion of said stalled region at a velocity substantially less than the velocity of flame propagation in the fluid-fuel mixture and at a temperature substantially greater than the ignition temperature of said stratified fluid-fuel mixture, and an orifice structure mounted in said conduit for reducing the velocity of said combustible fluid.

References Cited in the file of this patent

UNITED STATES PATENTS

| 2,404,335 | Whittle | July 16, 1946 |
| 2,409,176 | Allen | Oct. 15, 1946 |
| 2,479,777 | Price | Aug. 23, 1949 |
| 2,575,682 | Price | Nov. 20, 1951 |
| 2,619,795 | Drake | Dec. 2, 1952 |
| 2,639,581 | Cohen et al. | May 26, 1953 |